United States Patent
Cho et al.

(10) Patent No.: US 11,485,260 B2
(45) Date of Patent: Nov. 1, 2022

(54) LUMBAR SUPPORT ASSEMBLY

(71) Applicant: DAECHANG SEAT CO., LTD-DONGTAN, Gyeonggi-do (KR)

(72) Inventors: Chan Ki Cho, Gwangju (KR); Jin Oh Kim, Gyeonggi-do (KR); Kyoung Min Cho, Gyeonggi-do (KR)

(73) Assignee: DAECHANG SEAT CO., Gyeonggi-do (KR)

( * ) Notice: Subject to any disclaimer, the term of this patent is extended or adjusted under 35 U.S.C. 154(b) by 0 days.

(21) Appl. No.: 17/265,791

(22) PCT Filed: Jun. 24, 2019

(86) PCT No.: PCT/KR2019/007598
§ 371 (c)(1),
(2) Date: Feb. 3, 2021

(87) PCT Pub. No.: WO2020/045806
PCT Pub. Date: Mar. 5, 2020

(65) Prior Publication Data
US 2021/0162901 A1     Jun. 3, 2021

(30) Foreign Application Priority Data
Aug. 28, 2018   (KR) .................. 10-2018-0101407

(51) Int. Cl.
*B60N 2/66*     (2006.01)
*A47C 7/46*     (2006.01)
*B60N 2/70*     (2006.01)

(52) U.S. Cl.
CPC .............. *B60N 2/665* (2015.04); *A47C 7/467* (2013.01); *B60N 2/7058* (2013.01)

(58) Field of Classification Search
CPC .................................. B60N 2/665; A47C 7/467
See application file for complete search history.

(56) References Cited

U.S. PATENT DOCUMENTS

| | | | |
|---|---|---|---|
| 5,076,643 A * | 12/1991 | Colasanti | A47C 7/467 297/284.6 |
| 6,916,300 B2 * | 7/2005 | Hester | A61H 23/04 601/149 |

(Continued)

FOREIGN PATENT DOCUMENTS

| | | |
|---|---|---|
| CN | 204506635 U | 7/2015 |
| EP | 1825783 A1 | 8/2007 |

(Continued)

OTHER PUBLICATIONS

International Search Report for PCT/KR2019/007598, dated Oct. 11, 2019, 9 pages.

(Continued)

*Primary Examiner* — Syed A Islam
(74) *Attorney, Agent, or Firm* — Fay Sharpe LLP

(57) ABSTRACT

Proposed is a lumbar support assembly having an air bladder and components for operating the air bladder and facilitating the assembly and maintenance thereof. The lumbar support assembly includes: a suspension mat having a first hole formed at the inner side thereof, and having a second hole formed at one edge thereof; an air bladder having a first clip hole, which is formed at one edge thereof and overlaps with the first hole; a pouch including a pump and having a second clip hole, which is formed at one edge thereof and overlaps with the second hole; a fixing clip that can be mounted in the first clip hole or the second clip hole; and an electronic valve which has a first tube connected to the air bladder and a second tube connected to the pump and which is coupled to the rear surface of the suspension mat.

6 Claims, 5 Drawing Sheets

(56) References Cited

U.S. PATENT DOCUMENTS

| | | | |
|---|---|---|---|
| 8,727,434 B2* | 5/2014 | Sahashi | B60N 2/66 |
| | | | 297/180.13 |
| 9,517,777 B2* | 12/2016 | Hall | B60N 2/914 |
| 10,743,668 B2* | 8/2020 | Sakai | B60N 2/68 |
| 2010/0244504 A1* | 9/2010 | Colja | A61H 9/0078 |
| | | | 297/284.6 |
| 2013/0169010 A1* | 7/2013 | Sugiyama | B60N 2/66 |
| | | | 297/216.13 |

FOREIGN PATENT DOCUMENTS

| | | | |
|---|---|---|---|
| JP | 2011161943 A | 8/2011 | |
| JP | 2013129245 A | 7/2013 | |
| KR | 1016091610000 B1 | 4/2016 | |
| KR | 101701141 B1 | 2/2017 | |
| KR | 1017011410000 B1 | 2/2017 | |

OTHER PUBLICATIONS

First Examination for Indian Application No. 202117004928, dated Apr. 28, 2021, 6 pages.

Office Action for Japanese Application No. 2021-505972, dated Mar. 22, 2022, 8 pages.

Office Action for Korean Application No. 10-2018-0101407, dated Oct. 19, 2019, 5 pages.

* cited by examiner

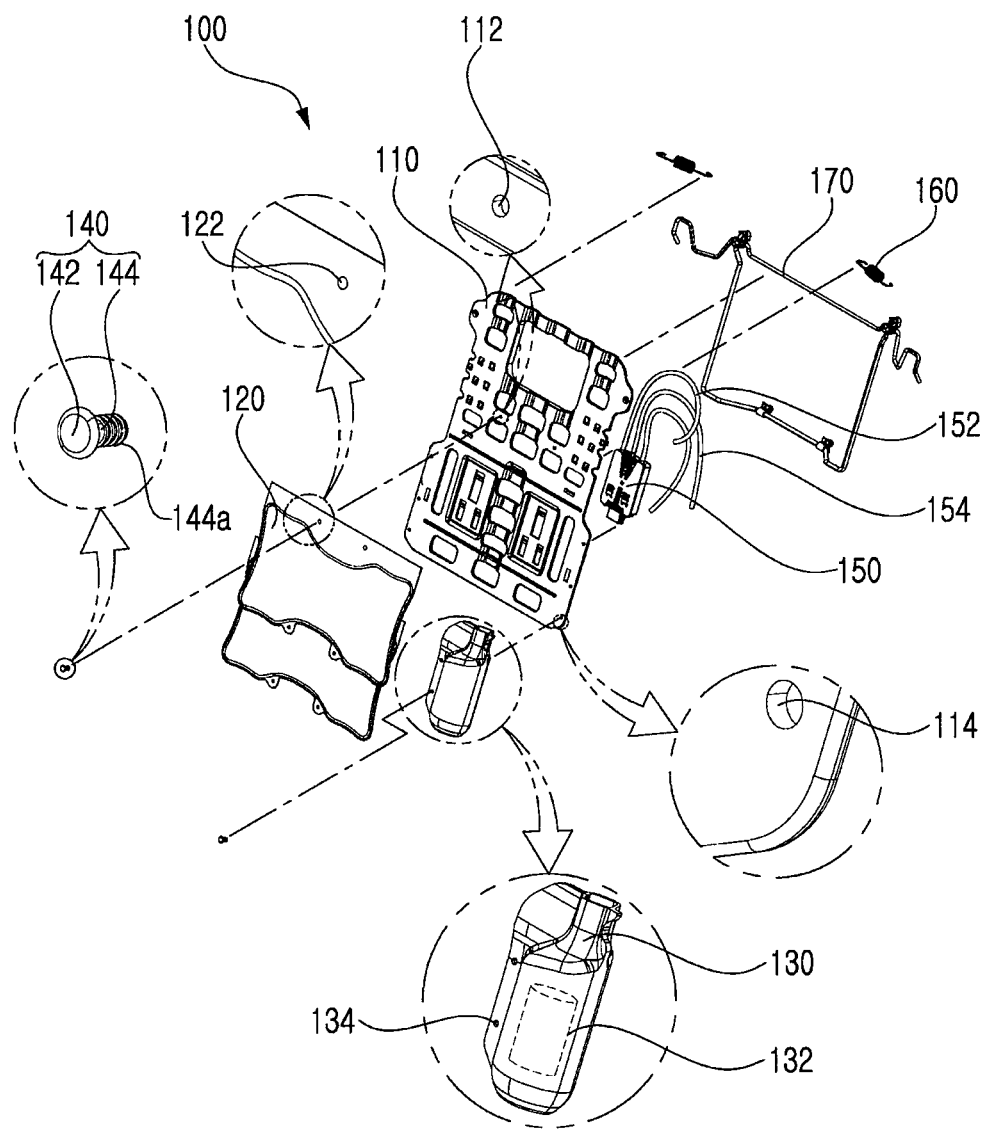
[Fig. 1]

[Fig. 2]
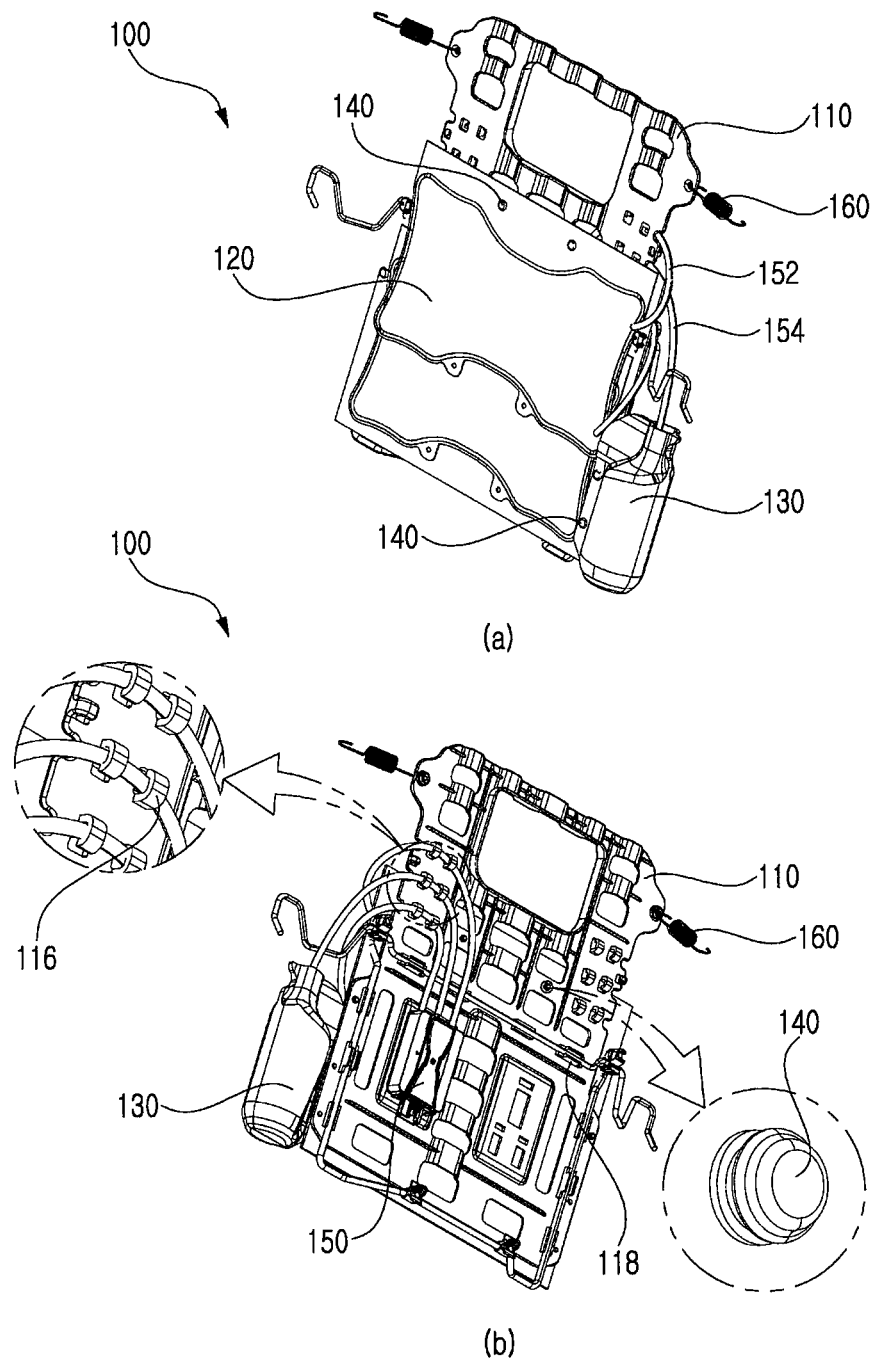

[Fig. 3]
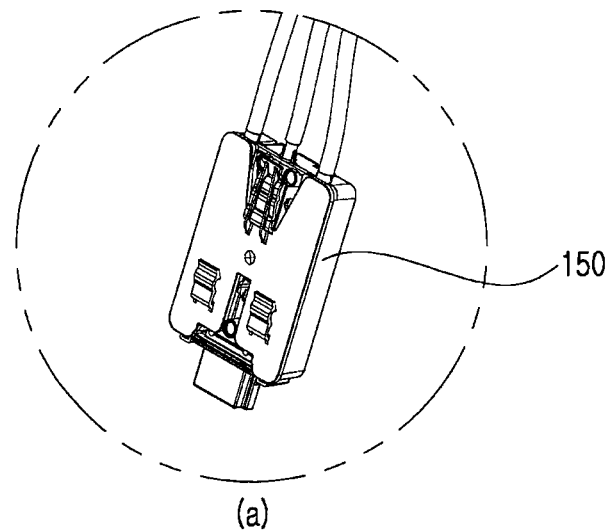
(a)
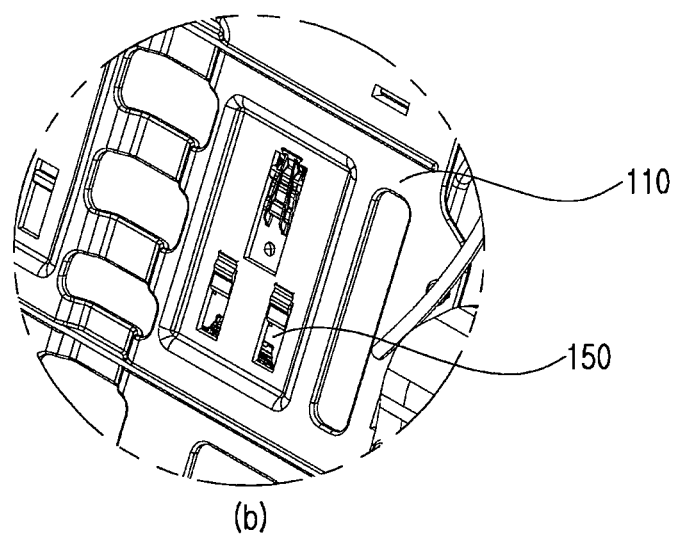
(b)

[Fig. 4]
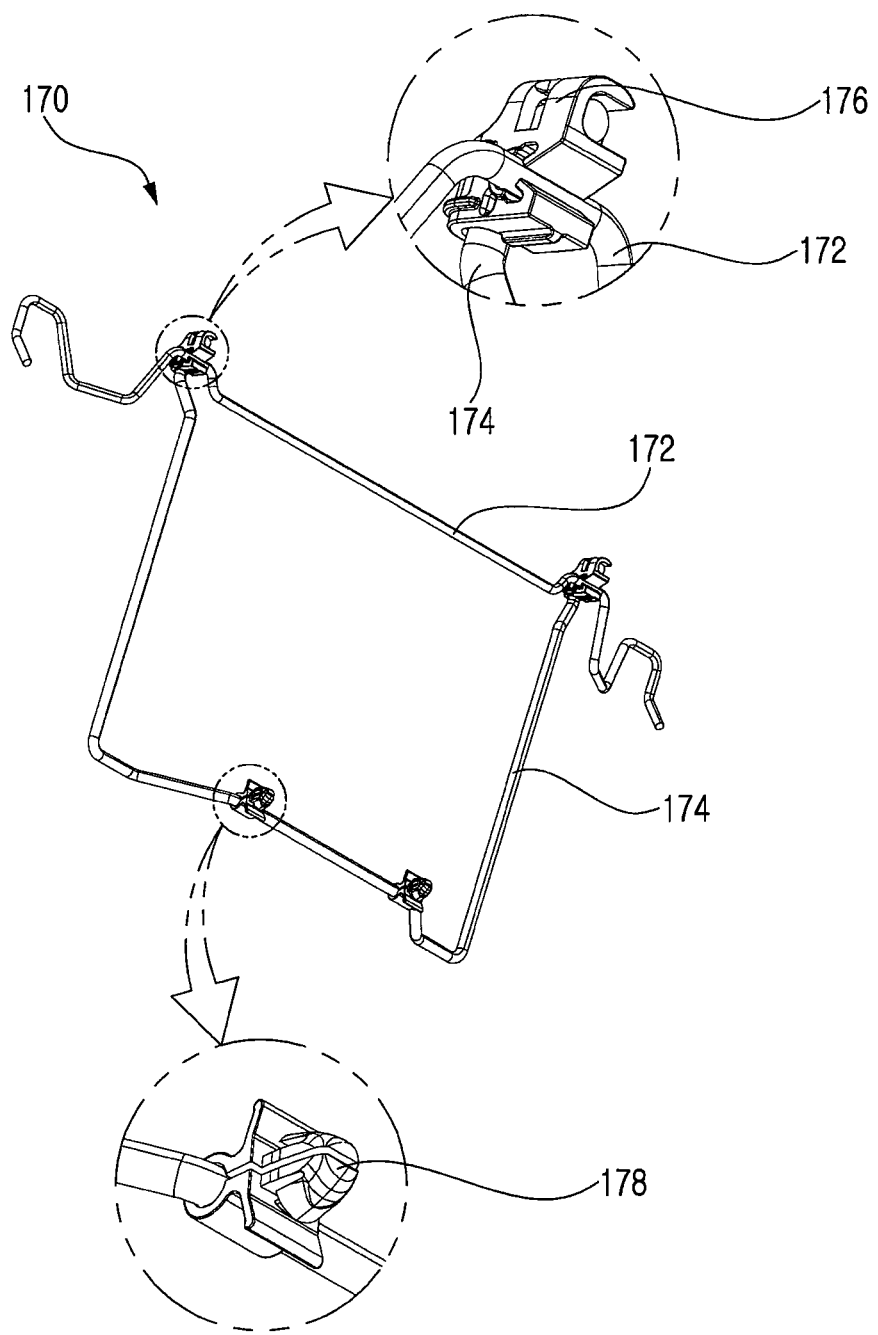

[Fig. 5]
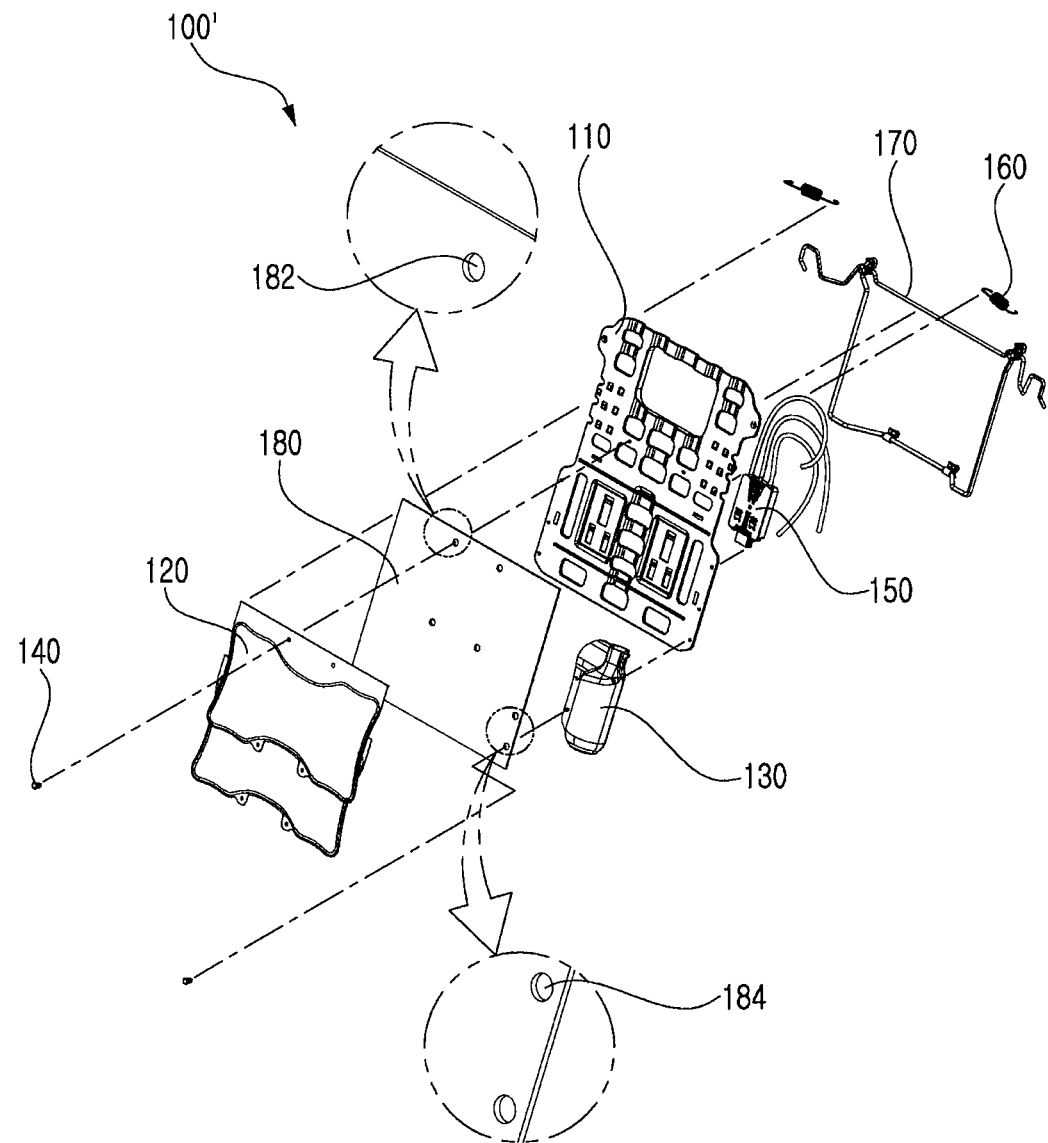

LUMBAR SUPPORT ASSEMBLY

CROSS-REFERENCE TO RELATED APPLICATION

This Application is a Section 371 National Stage Application of International Application No. PCT/KR2019/007598, filed Jun. 24, 2019, the contents of which is hereby incorporated by reference in its entirety.

TECHNICAL FIELD

The present disclosure relates to a lumbar support assembly provided in a backrest of a seat. More particularly, the present disclosure relates to a lumbar support assembly including an air bladder.

BACKGROUND ART

In this section, the related art is described to help understand the technical significance of the present disclosure. However, it does not mean that the described related art is known to those skilled in the art before the present disclosure is filed, unless clearly stated otherwise.

A lumbar support assembly means a seat component that is provided in a seat backrest of a vehicle or the like, thus supporting the lower back of a seat user.
Furthermore, as known in Korean Patent No. 10-0160916 and Korean Patent No. 10-1701141, a lumbar support assembly may include a plurality of air bladders.

The plurality of air bladders is selectively expanded or contracted by the operation of a seat user, thus alleviating the fatigue of the lower back of the seat user.

Meanwhile, the lumbar support assembly having the air bladder includes, as essential components, a suspension mat that supports the back, a pump that provides air to the air bladder, an electronic valve that controls the air flowing into/out of the air bladder, and a plurality of tubes that connect the pump and the electronic valve or connect the electronic valve and a plurality of air bladders.

Furthermore, the lumbar support assembly disclosed in Korean Patent No. 10-1701141 is configured such that the air bladder is attached to the suspension mat by heat fusion, and the pump is integrated with the electronic valve. Due to such a configuration, assembly and maintenance (component replacement) are not easy.

DOCUMENTS OF RELATED ART (Patent Document 1) KR10-1609161 B1 (Apr. 20, 2016)
(Patent Document 2) KR10-1701141 B1 (Feb. 1, 2017)

DISCLOSURE

Technical Problem

Therefore, the present disclosure is intended to provide a lumbar support assembly, which has an air bladder and components for operating the air bladder, and facilitates the assembly and maintenance thereof.

Technical Solution

In order to accomplish the above objective, the present disclosure provides a lumbar support assembly, including a suspension mat having a first hole formed at an inner side thereof, and having a second hole formed at one edge thereof; an air bladder having a first clip hole, which is formed at one edge thereof and overlaps with the first hole; a pouch including a pump and having a second clip hole, which is formed at one edge thereof and overlaps with the second hole; a fixing clip mounted in the first clip hole or the second clip hole; and an electronic valve having a first tube connected to the air bladder and a second tube connected to the pump, the electronic valve being coupled to a rear surface of the suspension mat.

The fixing clip may include a plate-shaped head part, and a support part formed on one side of the head part, and having a plurality of ring-shaped locking steps that are formed on an outer circumference of the support part in a longitudinal direction thereof.

At least one hook may be formed on the rear surface of the suspension mat to fix the first tube or the second tube.

The lumbar support assembly may further include a pair of tension springs coupled to both edges of an upper portion of the suspension mat, and a wire unit coupled to the rear surface of the suspension mat.

The lumbar support assembly may further include a felt pad having a first communication hole that communicates with the first hole and the first clip hole, and a second communication hole that communicates with the second hole and the second clip hole, the felt pad being attached to a front surface of the suspension mat.

Advantageous Effects

A lumbar support assembly according to an embodiment of the present disclosure is significantly easier in assembly and maintenance (component replacement), compared to a conventional lumbar support assembly mentioned in the Background Art section.

DESCRIPTION OF DRAWINGS

FIG. 1 is an exploded perspective view of a lumbar support assembly 100 according to an embodiment.
FIG. 2 is a perspective view of the lumbar support assembly 100 according to the embodiment.
FIG. 3 is a diagram illustrating a coupling structure of a suspension mat 110 and an electronic valve 150.
FIG. 4 is a perspective view of a wire unit 170.
FIG. 5 is an exploded perspective view of a lumbar support assembly 100' according to another embodiment.

DESCRIPTION OF REFERENCE NUMERALS OF IMPORTANT PARTS

100: lumbar support assembly
110: suspension mat
112: first hole
114: second hole
116: hook
118: wire fixing protrusion
120: air bladder
122: first clip hole
130: pouch
132: pump
134: second clip hole
140: fixing clip
142: head part
144: support part
144a: locking step
150: electronic valve
152: first tube 154: second tube
160: tension spring
170: wire unit
172: first wire
174: second wire
176: hanger clip
178: wire clip
180: felt pad
182: first communication hole
184: second communication hole

MODE FOR INVENTION

Hereinafter, lumbar support assemblies 100 and 100' according to various embodiments will be described in detail with reference to the accompanying drawings.

FIG. 1 is an exploded perspective view of a lumbar support assembly 100 according to an embodiment, and FIG. 2 is a perspective view of the lumbar support assembly 100 according to the embodiment.

Referring to FIGS. 1 and 2, the lumbar support assembly 100 according to the embodiment includes a suspension mat 110, an air bladder 120, a pouch 130, a fixing clip 140, and an electronic valve 150.

The suspension mat 110 is installed in a seat, and functions to support the back of a passenger sitting on a seat. The suspension mat 110 has a predetermined area, and may be made of a metal material and a synthetic-resin material each having elasticity.

At least one first hole 112 is formed in the inner side of the suspension mat 110, and at least one second hole 114 is formed in an edge thereof. The number of first holes 112 may be changed depending on the number of air bladders 120 and the shape of each air bladder 120, and the number of second holes 114 may be changed depending on the size and shape of the pouch 130.

Meanwhile, for the purpose of the compatibility of the component (the fixing clip 140), the first hole 112 and the second hole 114 may be formed to have the same size.

The air bladder 120 is a component that expands when air is injected, and functions to alleviate the lower-back fatigue of a passenger sitting on the seat. The air bladder comprises at least one or more air bladders. The air bladder 120 is coupled to a front surface of the suspension mat 110.

A first clip hole 122 is formed in one edge (the center of an upper portion, etc.) of the air bladder 120 to overlap the first hole 112. The first clip hole 122 may have the same size as the first hole 112. Depending on the size and shape of the air bladder 120, the location of the first clip hole 122 may be adjusted.

A pump 132 is provided in the pouch 130 to provide air to the air bladder 120, and a second clip hole 134 is formed in one side of the pouch 130 to overlap the second hole 114.

The fixing clip 140 comprises a plurality of fixing clips, and is inserted into the first clip hole 122 in a state where the first hole 112 and the first clip hole 122 overlap each other, thus fixing the air bladder 120 to the suspension mat 110. Furthermore, in the state where the second hole 114 and the second clip hole 134 overlap each other, the fixing clip is inserted into the second clip hole 134, thus fixing the pouch 130 to the suspension mat 110.

The fixing clip 140 may be formed of a synthetic resin material.

The fixing clip 140 may be formed in various shapes. For example, the fixing clip 140 may include a plate-shaped head part 142, and a support part 144 that protrudes from a side of the head part 142 and has a plurality of ring-shaped locking steps 144a formed on an outer circumference of the support part in a longitudinal direction thereof.

The electronic valve 150 includes a first tube 152 that is connected to the air bladder 120 (the number of first tubes 152 may be changed depending on the number of air bladders 120), and a second tube 154 that is connected to the pump 132 provided in the pouch 130. The electronic valve is coupled to the back of the suspension mat 110.

FIG. 3 is a diagram illustrating a coupling structure of the suspension mat 110 and the electronic valve 150.

Referring to FIG. 3, in the lumbar support assembly 100 according to the embodiment, a plurality of fixing holes is formed in the suspension mat 110, and a plurality of fixing hooks is provided on the electronic valve 150, so that the fixing hooks are inserted into the fixing holes, thus allowing the electronic valve 150 to be coupled to the suspension mat 110.

Meanwhile, the lumbar support assembly 100 according to the embodiment may further include a tension spring 160 and a wire unit 170. The tension spring 160 and the wire unit 170 are used to fix the lumbar support assembly 100 according to the embodiment to a seat frame.

The wire unit 170 may be coupled to a plurality of wire fixing protrusions 118 provided on the rear surface (back) of the suspension mat 110. Furthermore, the wire unit 170 and the suspension mat 110 may be formed to be coupled to each other through insert molding. Referring to FIG. 4, the wire unit 170 may include a straight-line-shaped first wire 172, a 'U'-shaped second wire 174, a hanger clip 176, and a wire clip 178.

FIG. 5 is an exploded perspective view of a lumbar support assembly 100' according to another embodiment.

Referring to FIG. 5, the lumbar support assembly 100' according to another embodiment further includes a felt pad 180 of a predetermined area, which is made of a material for absorbing vibration or sound, unlike the lumbar support assembly 100 according to the preceding embodiment. The felt pad 180 is provided between the suspension mat 110 and the air bladder 120. A first communication hole 182 communicating with a first hole 112 and a first clip hole 122, and a second communication hole 184 communicating with a second hole 114 and a second clip hole 134 may be formed in the felt pad 180.

Since the lumbar support assemblies 100 and 100' according to various embodiments are configured such that the air bladder 120 and the pouch 130 can be rapidly coupled to the suspension mat 110 using the fixing clip 140, the lumbar support assemblies are significantly easier in assembly and maintenance (component replacement), compared to a conventional lumbar support assembly mentioned in the Background Art section.

Furthermore, a hook 116 is provided on the suspension mat 110, so that there is no cable tie, thus making it possible to neatly arrange the first tube 152 and the second tube 154.

Although specific embodiments of the present disclosure have been disclosed in detail as described above, it is obvious to those skilled in the art that such description is merely of preferable exemplary embodiments and is not construed to limit the scope of the present invention.

Therefore, the substantial scope of the present invention will be defined by the appended claims and equivalents thereof.

The invention claimed is:

1. A lumbar support assembly, comprising:
   a suspension mat having a first hole formed at an inner side thereof, and having a second hole formed at one edge thereof;

an air bladder having a first clip hole, which is formed at one edge thereof and overlaps with the first hole;

a pouch including a pump and having a second clip hole, which is formed at one edge thereof and overlaps with the second hole;

a fixing clip mounted in the first clip hole or the second clip hole; and an electronic valve having a first tube connected to the air bladder and a second tube connected to the pump, the electronic valve being coupled to a rear surface of the suspension mat, wherein the air bladder and the pouch are coupled to the suspension mat using the fixing clip.

2. The lumbar support assembly of claim 1, wherein the fixing clip comprises:

a plate-shaped head part; and a support part formed on one side of the head part, and having a plurality of ring-shaped locking steps that are formed on an outer circumference of the support part in a longitudinal direction thereof.

3. The lumbar support assembly of claim 1, wherein at least one hook is formed on the rear surface of the suspension mat to fix the first tube or the second tube.

4. The lumbar support assembly of claim 1, further comprising:

a pair of tension springs coupled to both edges of an upper portion of the suspension mat.

5. The lumbar support assembly of claim 1, further comprising:

a wire unit coupled to the rear surface of the suspension mat.

6. The lumbar support assembly of claim 1, further comprising:

a felt pad having a first communication hole that communicates with the first hole and the first clip hole, and a second communication hole that communicates with the second hole and the second clip hole, the felt pad being attached to a front surface of the suspension mat.

\* \* \* \* \*